United States Patent
Rao et al.

(10) Patent No.: US 11,558,237 B2
(45) Date of Patent: Jan. 17, 2023

(54) METHOD AND CONTROL SYSTEM FOR MONITORING PLURALITY OF EQUIPMENT IN SNMP BASED NETWORK

(71) Applicant: ABB Schweiz AG, Baden (CH)

(72) Inventors: Nandan Rao, Bangalore (IN); Arijit Bose, Bangalore (IN); A Pavan Kumar Tatavarthi, Bangalore (IN); Richard Deverson, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/287,797

(22) PCT Filed: Oct. 11, 2019

(86) PCT No.: PCT/IB2019/058684
§ 371 (c)(1),
(2) Date: Apr. 22, 2021

(87) PCT Pub. No.: WO2020/084377
PCT Pub. Date: Apr. 30, 2020

(65) Prior Publication Data
US 2021/0314213 A1    Oct. 7, 2021

(30) Foreign Application Priority Data
Oct. 22, 2018   (IN) .............................. 201841039806

(51) Int. Cl.
*H04L 41/0213*     (2022.01)
*H04L 41/0233*     (2022.01)
(Continued)

(52) U.S. Cl.
CPC ...... *H04L 41/0213* (2013.01); *H04L 41/0233* (2013.01); *H04L 41/04* (2013.01); *H04L 41/0843* (2013.01); *H04L 41/28* (2013.01)

(58) Field of Classification Search
CPC . H04L 41/0213; H04L 41/0233; H04L 41/04; H04L 41/0843; H04L 41/28
(Continued)

(56) References Cited

U.S. PATENT DOCUMENTS 8,032,540 B1 *  10/2011  Xie ..................... H04L 41/0266
                                                707/756
9,779,424 B1 *  10/2017  Kakarlapudi ...... G06Q 30/0276
(Continued)

FOREIGN PATENT DOCUMENTS

CN          104620539 B     11/2017

OTHER PUBLICATIONS

Indian Patent Office, First Examination Report for related IN 201841039806, dated Feb. 18, 2021, 8 pages.
(Continued)

*Primary Examiner* — David P Zarka
(74) *Attorney, Agent, or Firm* — Leydig, Voit & Mayer, Ltd.

(57) ABSTRACT

The present invention discloses a method and control system for monitoring plurality of equipment in industrial plant connected over SNMP based network. Each of plurality of equipment is associated with a server which is communicatively connected with client. One or more equipment which are capable of reporting monitoring objects are identified using a configuration file. Further, polling for monitoring objects based on capability data associated with one or more equipment is performed. Secure configuration of plurality of equipment in SNMP based network is achieved. Management of network traffic is performed. Unauthorized extraction of monitoring objects is reduced in the network.

8 Claims, 4 Drawing Sheets

(51) Int. Cl.
*H04L 41/04* (2022.01)
*H04L 41/084* (2022.01)
*H04L 41/28* (2022.01)

(58) Field of Classification Search
USPC ......................................................... 709/224
See application file for complete search history.

(56) References Cited

U.S. PATENT DOCUMENTS

| | | | | |
|---|---|---|---|---|
| 10,693,680 | B2* | 6/2020 | Sauerwein, Jr. | H04L 9/32 |
| 10,819,586 | B2* | 10/2020 | Biran | H04L 41/28 |
| 2003/0088698 | A1* | 5/2003 | Singh | H04L 12/4641 |
| | | | | 709/239 |
| 2004/0078441 | A1* | 4/2004 | Malik | G06Q 10/107 |
| | | | | 709/206 |
| 2004/0268078 | A1* | 12/2004 | Hassan | G06F 9/5016 |
| | | | | 711/170 |
| 2013/0339503 | A1 | 12/2013 | Annamalaisami et al. | |
| 2016/0156501 | A1* | 6/2016 | Hsu | H04L 41/046 |
| | | | | 709/224 |
| 2016/0182191 | A1* | 6/2016 | Rosenberg | H04L 65/80 |
| | | | | 370/392 |

OTHER PUBLICATIONS

European Patent Office, International Search Report for PCT/IB2019/058684, dated Feb. 20, 2020, 3 pages.

European Patent Office, Written Opinion of the Searching Authority for PCT/IB2019/058684, dated Feb. 20, 2020, 8 pages.

Duc-Lam Vu, "Master Thesis REST-Based Network Management Solution for Accessing SNMP Infrastructures," available at http://www.rn.inf.tu-dresden.de/uploads/Studentische_Arbeiten/Master_Vu_Duc_Lam_n.pdf, Aug. 20, 2008.

P. F. Cardoso et al., "SNMP and Industrial Networks," Proceedings of the 24th Annual Conference of the IEEE Industrial Electronics Society, Aug. 31, 1998, pp. 242-246.

* cited by examiner

METHOD AND CONTROL SYSTEM FOR MONITORING PLURALITY OF EQUIPMENT IN SNMP BASED NETWORK

CROSS-REFERENCE TO RELATED APPLICATIONS

This application is a U.S. national stage of International Application Serial No. PCT/IB2019/058684, filed Oct. 11, 2019, which claims priority to Indian Patent Application No. 201841039806, filed Oct. 22, 2018. The entire disclosures of both of the foregoing applications are incorporated herein by reference.

TECHNICAL FIELD

The present disclosure in general relates to monitoring plurality of equipment in an industrial plant. More particularly, the present disclosure relates to a method for monitoring plurality of equipment in the industrial plant in a Simple Network Management Protocol (SNMP) based network.

BACKGROUND

Industrial plants such as power plants, cement plants, refineries and so on, include plurality of process equipment used for physical or chemical methods for mechanical or thermal treatment or for processing raw material or product in the industrial plant. The plurality of process equipment may include, but is not limited to, turbines, pumps, motors, fans, compressors, boilers, heat exchangers and so on.

In an internet domain, SNMP may be most widely used network monitoring protocol for monitoring health of network equipment or devices. For example, IEC 62351-7, an international standard also recommends SNMP to perform health monitoring of power system. The SNMP based health monitoring requires initialization and configuration of equipment in the network. Such initialization and configuration may impact embedded equipment of the network and their commissioning process. It is required that the SNMP configuration process must be secure in the network.

The SNMP is based on a client-server model where the server of the SNMP based network typically resides on the equipment and the client of the SNMP based network is part of an SNMP monitoring application. The client polls and acquires status values of data that is to be monitored from the equipment. The data may be status values of different types of equipment in the network and may include information such as incoming network traffic, CPU load and so on. In the SNMP based network, the data to be monitored is represented as monitoring objects, and the SNMP monitoring application polls and obtains the status values of such monitoring objects. For example, consider first equipment and second equipment in a network need to report status of a digital certificate serial number used for a secure communication and number of redundant power supplies in the SNMP based network, for the monitoring. The first equipment is enabled to communicate using a secure communication such as Transport Layer Security (TLS) protocol. However, consider the second equipment is not configured to communicate in the secure communication. Such second equipment may not use a digital certificate. As a result, the second equipment only has capability to report the number of redundant power supplies. Therefore, if the client of the SNMP keeps polling the digital certificate serial number from both the first equipment and the second equipment, the client may not receive monitoring object from the second equipment. For large number of equipment like the second equipment, such pooling may result in a large number of network messages yielding no monitoring values. This unnecessary traffic is inefficient and may consume network bandwidth in an industrial domain. Since any industrial system is a heterogeneous environment composed of legacy (non-SNMP) and future (SNMP enabled) equipment. Such unnecessary network traffic load can also occur if the client starts polling an equipment which is a non-SNMP supported equipment.

Further, configuration of SNMP User-based Security Model (USM) in the SNMP based network requires each and every SNMP supported equipment to be configured manually with USM security credentials. Each equipment in the network may be associated with their respective username and password. Manual configuration of each of the equipment may lead to errors and may be cumbersome when fleets of such SNMP supported equipment grow in number. Most importantly, whoever is configuring the SNMP supported equipment with their security credentials must be a trusted entity. If a rogue entity configures the equipment, an attacker may be able to monitor all health information of that equipment. This information may be very useful when preparing for subsequent attacks.

SUMMARY

The present disclosure discloses a method and a control system for monitoring plurality of equipment in an industrial plant in a Simple Network Management Protocol (SNMP) based network. Each of the plurality of equipment is associated with a control system in the SNMP based network. The control system comprises plurality of servers, at least one client and a database. The plurality of equipment is associated with at least one server from the plurality of servers communicatively connected with the at least one client. The method is performed by the at least one client of the control system. Initially, for the monitoring, configuration file associated with each of the plurality of equipment is generated for commissioning of the SNMP based network in the industrial plant by a system engineering tool. The configuration file is in a generic file format and comprises equipment data associated with the plurality of equipment. The generic file format of the configuration file may be Java Script Object Notation (JSON) format.

Based on the configuration file, SNMP monitor identifies one or more equipment from the plurality of equipment, which are capable of reporting monitoring objects in the SNMP based network. These equipment are referred to as SNMP enabled equipment. The configuration file is converted to Extensible Markup Language (XML) format for identifying the one or more SNMP enabled equipment.

Further, a secure communication channel based on digital certificate are established for each of the one or more SNMP enabled equipment as identified from the configuration file, where the digital certificate for each of the SNMP enabled equipment is obtained by registering the SNMP enabled one or more equipment using certificate authority. The communication channels may be established by communication protocol such as Transport Layer Security (TLS).

In the TLS protocol, initially, handshake is performed with each of the one or more SNMP enabled equipment using a digital certificate issued by the certificate authority to the at least one client and the SNMP enabled one or more equipment. Authenticity of each of the one or more SNMP enabled equipment by the client and vice versa is verified based on the handshake and validation of their digital certificates. Once it's valid, a TLS communication between SNMP enabled one or more equipment with the client is established.

Upon establishing the TLS communication channels, a capability file is received from each of the one or more SNMP enabled equipment through the established TLS communication channels. The capability file of an SNMP enabled equipment indicates one or more monitoring objects that the equipment is capable to report by SNMP. Further to this, an acknowledgement is provided to the client by the one or more SNMP enabled equipment that are ready to be operated in SNMP TLS mode Based on the capability file and configuration file, polling for the one or more monitoring objects from the one or more SNMP enabled equipment is performed, for monitoring the plurality of equipment. For polling, the Management Information Base (MIB) data is generated for each of the one or more SNMP enabled equipment based on corresponding capability file. The MIB data is transmitted to the corresponding equipment for polling.

BRIEF DESCRIPTION OF ACCOMPANYING DRAWINGS

DETAILED DESCRIPTION

The present invention discloses a method and a control system for monitoring plurality of SNMP enabled equipment in an industrial plant in a SNMP based network. The control system comprises plurality of servers, at least one client (also referred to as SNMP monitor), a system engineering tool and a database. Each of the plurality of equipment is associated with at least one server from the plurality of servers communicatively connected with the at least one client. The system engineering tool is configured to commission the plurality of equipment in the SNMP based network, using configured file that is in a generic format. One or more equipment which are capable of reporting monitoring objects are identified using the configuration file. Further, poll for the monitoring objects based on capability data associated with each of the one or more equipment is performed, by the SNMP monitor. By the proposed invention, efficient and secure configuration of the plurality of equipment in the SNMP based network may be achieved. Also, efficient management of network traffic may be performed. Unauthorized extraction of the monitoring objects is reduced in the network.

Figure 1:
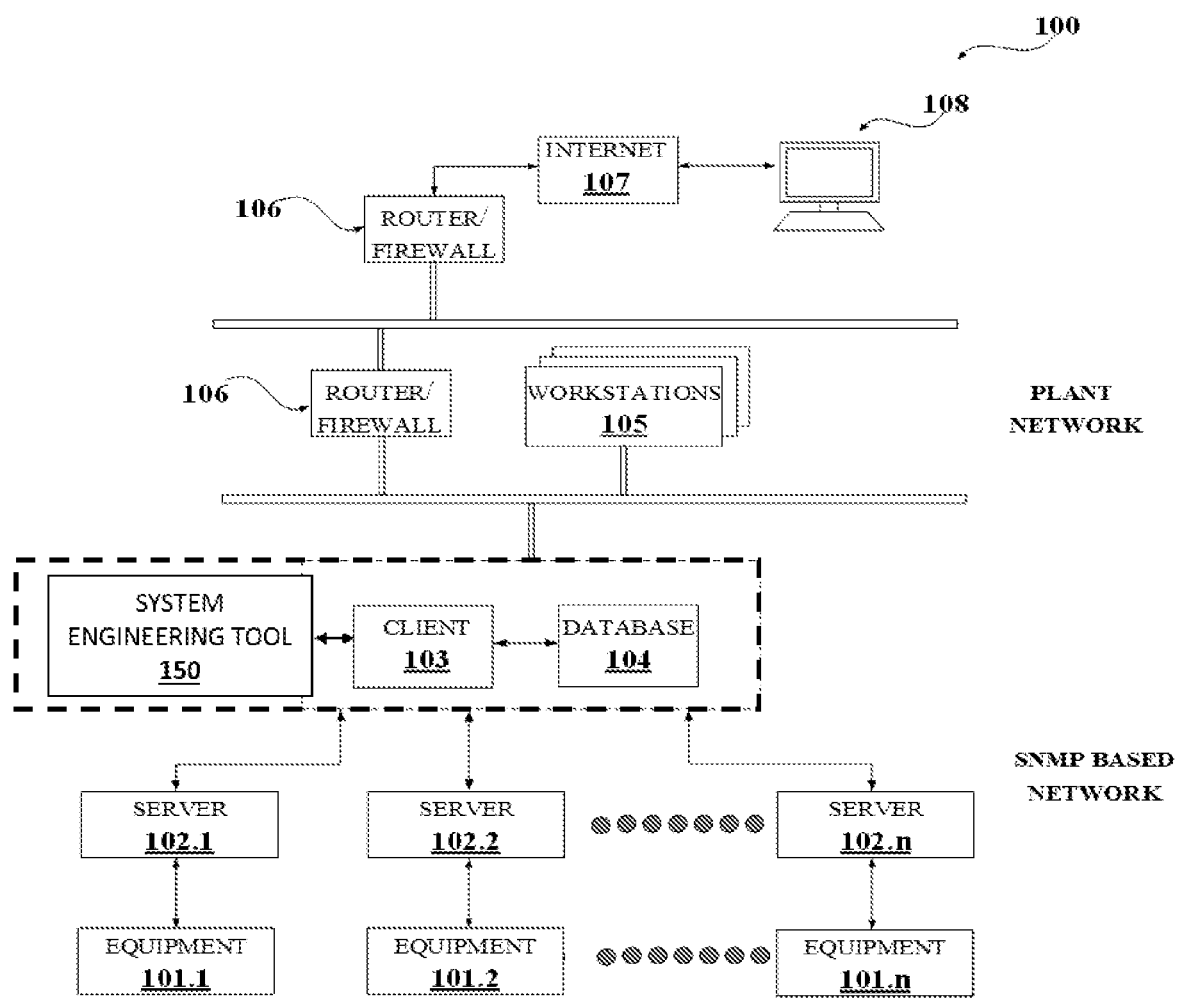
FIG. 1 illustrates a block diagram of a control system including one or more servers and at least one client, for monitoring plurality of equipment in an industrial plant in a SNMP based network, in accordance with an embodiment of the present disclosure.

FIG. 1 illustrates a block diagram of a control system 100. As shown in FIG. 1, the control system 100 comprises multiple layers of network. Bottom most layer of the control system 100 is a SNMP based network that comprises a plurality of servers 102.1 . . . 102.n (hereafter referred to as plurality of servers 102), at least one client 103 (also referred to as SNMP monitor), a database 104, and a system engineering tool 150. The control system 100 is connected with plurality of equipment 101.1 . . . 101.n (hereafter referred to as plurality of equipment 101) of an industrial plant in the SNMP based network. The plurality of equipment 101 in the industrial plant may include, but are not limited to, turbines, pumps, motors, fans, compressors, boilers, heat exchangers and so on. Each of the plurality of equipment 101 may be operationally connected with at least one server from the plurality of servers 102 as shown in FIG. 1. For example, an equipment 101.1 from the plurality of equipment 101 is associated with a server 102.1, an equipment 101.2 from the plurality of equipment 101 is associated with a server 102.2 and so on. In an embodiment, the at least one server may be one of a dedicated server or a cloud-based server. In an embodiment, the plurality of equipment 101 may be associated with a single server (not shown in the Figure). The at least one server is configured to retrieve one or more data from corresponding equipment. In an embodiment, connection between the at least one server and the corresponding equipment may be one of a wired connection and a wireless connection. In an embodiment, the at least one server may be embedded on the corresponding equipment. The at least one server of each of the plurality of equipment 101 is operationally connected with the at least one client 103 to communicate the one or more data with the at least one client 103. The communication may be established via a wired network, a wireless network or a combination of both wired network and wireless network. In an embodiment, each of the plurality of servers 102 may communicate with each other via the SNMP based network. The SNMP based network may a wired network, a wireless network or a combination of both wired and wireless network. The database 104 of the control system 100 may be any storage means or a repository which is configured to store data for monitoring the plurality of equipment 101. In an embodiment, the database 104 may store the one or more data received from the plurality of servers 102 in the control system 100. In an embodiment, the database 104 may communicate directly with the plurality of servers 102 to receive and store the one or more data. In an embodiment, data determined, computed or identified by the at least one client 103, for monitoring the plurality of equipment 101, may also be stored in the database 104. In an embodiment, the database 104 may be an integral part of the at least one client 103.

The next layer of the control system 100 is a plant network that comprises one or more workstations 105 that communicate with the at least one client 103. The one or more workstations 105 are in turn connected to a remote terminal 108 over the Internet 107. Data transmission to a remote terminal 108 over the Internet 107 is subject to security measures that are provided by construction of routers/firewalls 106. The one or more workstations 105 enable operators or engineers to configure, monitor and control operations of at least one of the plurality of equipment 101, the plurality of servers 102 and the at least one client 103. The plurality of servers 102 and the at least one client 103 are configured to act as a bridge between the one or more workstations 105 and the plurality of equipment 101.

The at least one client 103 along with the plurality of servers 102 are configured to monitor the plurality of equipment 101 in the SNMP based network. In an embodiment, the at least one client 103 may be integrated with the system engineering tool. The at least one client 103 may comprises monitoring applications and is configured to function as defined in the present invention. The at least one client 103 may include a processor and a memory (not shown in the figure), for monitoring the plurality of equipment 101. The memory may be operationally coupled with the processor. The memory may comprise modules and data, which on execution may cause the processor to perform the monitoring of the plurality of equipment 101.

For monitoring the plurality of equipment 101, the at least one client 103 is configured to receive configuration file associated with each of the plurality of equipment 101. The configuration file for an equipment from the plurality of equipment 101 includes equipment data associated with the equipment. The system engineering tool is configured to generate the configuration file for the equipment. In an embodiment, the configuration file is generated at stage of commissioning of the industrial plant. In an embodiment, the configuration file for each of the plurality of equipment 101 may be generated when there is a modification in deployment of the industrial plant. The modification may include addition of an equipment, elimination of an equipment from the network, change in configuration of an equipment and so on. The equipment data may include, but not limited to, at least one of equipment name, equipment type, equipment SNMP capability, equipment MAC address, equipment IP address and so on. One or more additional data associated with the equipment may be included as the equipment data in the configuration file.

In an embodiment, the configuration file is in a generic file format. By this, irrespective of the domain associated with each of the plurality of equipment 101, the configuration file of each of the plurality of equipment 101 may be easily communicated over the SNMP based network. In a non-limiting embodiment, the generic file format may be Java Script Object Notation (JSON) format. The JSON format is computer language independent, standardized and can be interpreted by most computer language parsers that are available in the art. An exemplary format of the configuration file for an equipment in the JSON format is as shown below:

"equipment name"="name value"
"equipment SNMP capability="Boolean value",
"equipment MAC address"="MAC address value",
"equipment IP address"="IP address value".
where, "value" is naming text of the equipment;
"Boolean value" may be 0 or 1, where 1 means equipment is SNMP capable and 0 means is SNMP incapable;
"MAC address value" is MAC address of the equipment;
"IP address value" is IP address of the equipment.

Based on the received configuration file, the at least one client 103 is configured to identify one or more equipment, from the system engineering tool 150. The configuration file in the generic file format may be converted to Extensible Markup Language (XML) format or any other file format which serve the purpose for identifying the one or more equipment. One or more techniques, known to a person skilled in the art, may be implemented in the at least one client 103, for identifying the one or more SNMP enabled equipment using the configuration file.

Figure 2:
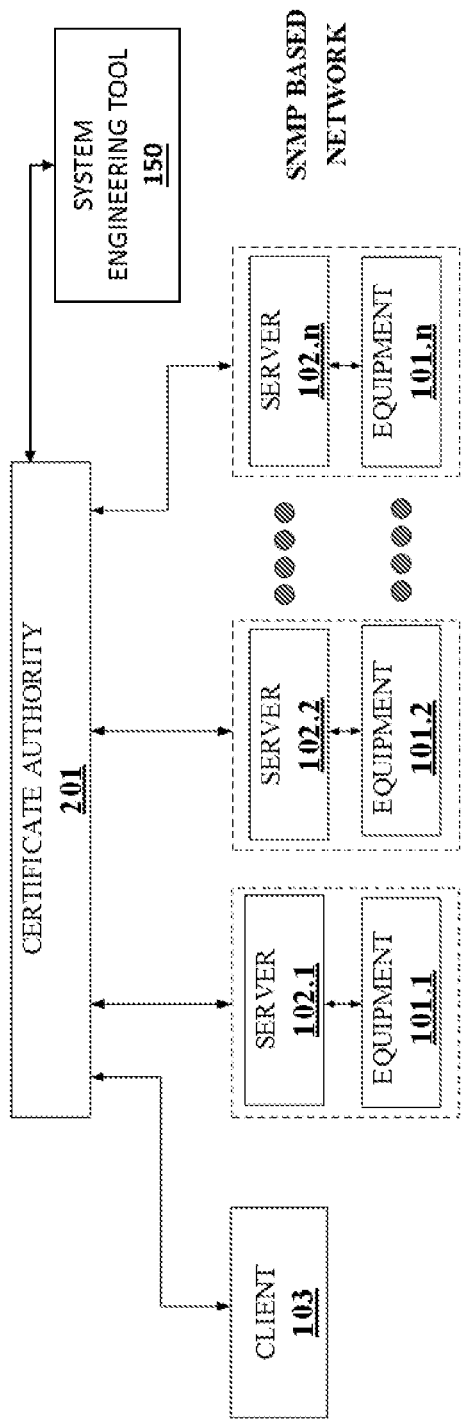
FIG. 2 illustrates registration of plurality of SNMP enabled equipment with a certification authority, in accordance with an embodiment of the present disclosure.

Further, the at least one client 103 is configured to establish communication channels for each of the one or more SNMP enabled equipment as identified from the configuration file. The communication channels may be established by registering the one or more SNMP enabled equipment using certificate authority. FIG. 2 of the present invention illustrates the registration of the at least one client 103 and the plurality of SNMP enabled equipment 101 using certificate authority 201. In an embodiment, before the commissioning of the industrial plant, the registration of the at least one client 103 and the plurality of SNMP enabled equipment 101 may be performed. During the registration, the at least one client 103 and each of the plurality of SNMP enabled equipment 101 are configured to enroll with the certificate authority 201 for a digital certificate. Upon the authentication, the certificate authority 201 issues the digital certificate for the at least one client 103 and each of the plurality of SNMP enabled equipment 101. Such registration provisions secure and risk-free communication between the at least one client 103 and the plurality of SNMP enabled equipment 101. Upon the registration, each of the at least one client 103 and the plurality of SNMP enabled equipment 101 own respective digital certificate which are digitally signed by the certificate authority 201, and is used in the present invention for establishing secure communication channel. In an embodiment, one or more techniques, known to a person skilled in the art, may be implemented for the registration.

In the present invention, the communication channel is established via Transport Layer Security (TLS) protocol using digital certificate. In the TLS protocol, initially, the at least one client 103 is configured to perform handshake with each of the one or more SNMP enabled equipment using the digital certificate. The handshake may include exchange of respective digital certificate in the network. By the handshake, authenticity of each of the one or more SNMP enabled equipment is verified by the at least one client 103 and vice versa. Also, the at least one server associated with each of the one or more SNMP enabled equipment may be configured to verify the authenticity of the at least one client 103. Once both side digital certificate is verified, TLS communication between SNMP enabled one or more equipment with the client is established.

Upon establishing the TLS communication channel, a capability file is received from each of the one or more SNMP enabled equipment through the communication channels. The capability file of an equipment indicates one or more monitoring objects that the SNMP enabled equipment is capable to communicate via the communication channels. In an embodiment, the capability file of an SNMP enabled equipment may be generated by at least one server corresponding to the SNMP enabled equipment. In an embodiment, the capability file of the SNMP enabled equipment may include an abstract representation of all monitoring objects that the SNMP enabled equipment is capable of monitoring their status values. An exemplary representation of the capability file for an equipment may be as shown below:

EquipmentAtkCnt: Number of attack counts
Name=EquipmentAtkCnt
Access=Read
Datatype=integer 32

In an embodiment, the at least one server may be configured to generate the capability file during commissioning of the industrial plant. In an embodiment, if the one or more monitoring objects associated with the equipment changes during run time phase of the equipment, the at least one server is configured to update the capability file of the equipment with updates one or more monitoring objects. The updated capability file may be shared with the at least one client 103.

In an embodiment, the capability file of the equipment received by the at least one client 103 may be encrypted by corresponding at least one server. The at least one server may digitally sign the capability file using the private key of the SNMP enabled equipment, available in the respective digital certificate. By this, tampering of the capability file during transit from the equipment to the at least one client 103, may be eliminated. Upon receiving the capability file, the at least one client 103 is configured to verify the signature using the public key of the SNMP enabled equipment.

In an embodiment, further communication in relation to polling of the monitoring objects associated with the equipment may be done in a SNMP USM (User based Security Model) mode. This may be indicated in the equipment data in the configuration file.

In the USM mode, the system engineering tool 150 or the client 103 generates a SNMP USM security configuration file containing the IP address of the at least one client 103 and the USM credentials for each SNMP enabled equipment. To transmit the USM credentials, the established TLS channel is utilized. In an embodiment, the system engineering tool 150 or the client 103 implements a technique to automatically generate the USM security configuration file for each for the one or more SNMP enabled equipment that are to be operated in SNMP USM mode. One or more techniques, known to a person skilled in the art, may be implemented for generating the USM security configuration file. The USM security configuration file for a corresponding equipment, from the one or more SNMP enabled equipment that are to be operated in SNMP USM mode, comprises IP address associated with the at least one client 103 and USM credential for the corresponding equipment. In an embodiment, the USM credential may include a username and a password for the corresponding equipment. In an embodiment, the USM credential for each of the one or more equipment may be distinct. By automatically generating the USM security configuration file, manual burden of a human entering the USM credential for each of the one or more equipment may be eliminated.

Upon the generation of the USM security configuration file, the system engineering tool 150 or the client 103 is configured to encrypt and sign the USM security configuration file. In an embodiment, the encryption may be performed using public key of each of the one or more SNMP enabled equipment that are to be operated in SNMP USM mode. In an embodiment, signing may be performed using private key of the system engineering tool 150 or the client 103. By the encryption, the corresponding equipment may be able to retrieve real content shared by the system engineering tool 150 or the client 103.

Upon the encryption and signing, the system engineering tool 150 or the client 103 is configured to transmit the USM security configuration file to the corresponding equipment. The at least one server associated with the corresponding equipment may be configured to verify the USM security configuration file. The verification performed by said at least one server includes to verify signature of the USM security configuration file and decrypt the USM security configuration file. In an embodiment, the signature may be verified using the public key of the system engineering tool 150 or the client 103. Upon verifying the signature to be valid, the at least one server decrypts the USM security configuration file using corresponding private keys available in the respective digital certificate. In an embodiment, one or more techniques, known to a person skilled in the art, may be implemented in the at least one server, for verifying the USM security configuration file.

In any of the TLS mode or the USM mode, the at least one server may acknowledge to the at least one client 103, using a message identifier. In an embodiment, the acknowledgement may be a message "READY" sent to the at least one client 103. SNMP enabled equipment that are to be operated in SNMP TLS mode send this acknowledgement flag after sending their capability file through the TLS communication channel SNMP enabled equipment that are to be operated in SNMP USM mode send this acknowledgment after the SNMP USM security configuration file is found valid by each of the corresponding equipment.

Based on the capability file and the configuration file, polling for the one or more monitoring objects from the one or more equipment that are SNMP enabled is performed, for monitoring the plurality of equipment 101. For polling, the MIB data is generated for each of the one or more SNMP enabled equipment based on corresponding capability file and configuration file. The MIB data is transmitted to the corresponding equipment for polling. In the USM mode, the USM credential is also transmitted along with the MIB data. Upon receiving the MIB data, the at least one server of each of the one or more equipment responds to the at least one client 103 with state values of the one or more monitoring objects indicated in corresponding MIB.

Figure 3:
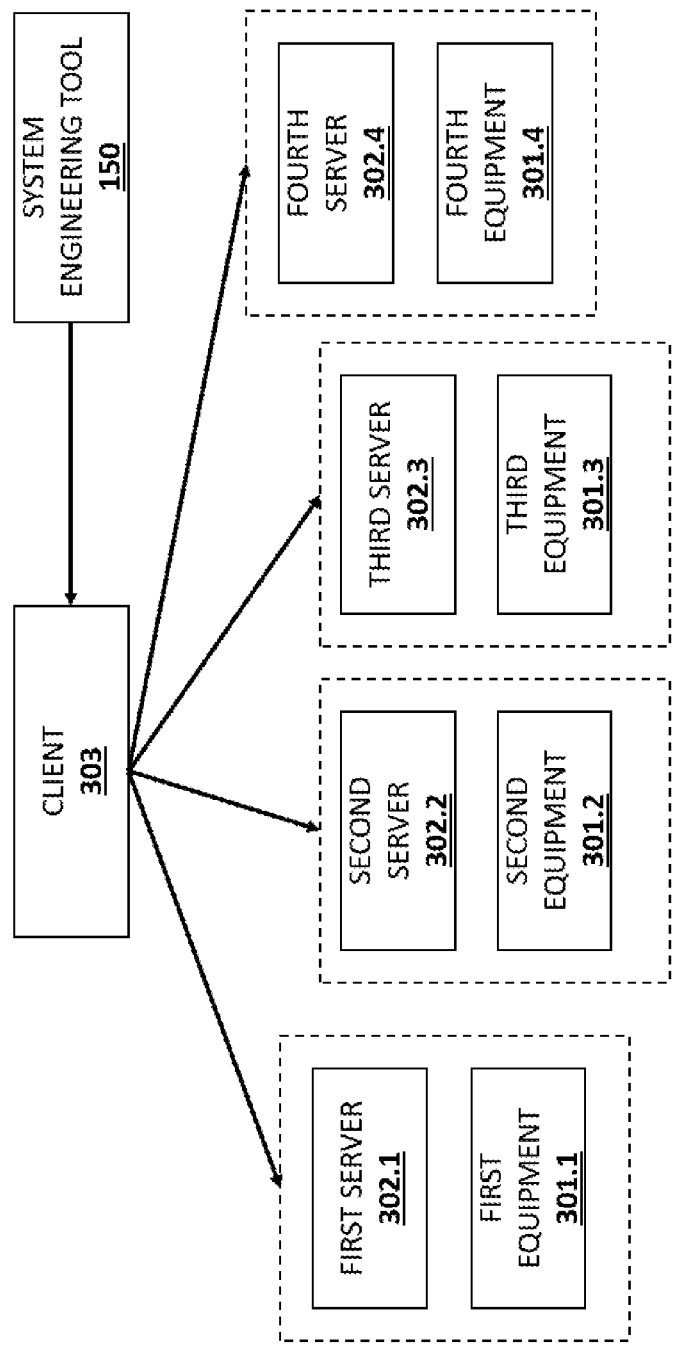
FIG. 3 illustrate exemplary embodiments of a control system for monitoring plurality of equipment in an industrial plant in a SNMP based network, in accordance with an embodiment of the present disclosure.

FIG. 3 shows an exemplary environment of the control system 100 for monitoring the plurality of equipment 101, in accordance with an embodiment of the present disclosure. Consider an industrial plant comprises plurality of equipment 302.1 . . . 302.4, including, a first equipment 301.1, a second equipment 301.2, a third equipment 301.3 and a fourth equipment 301.4. The exemplary environment comprises a client 303 with a database 104 (not shown in the figure) and a plurality of servers 302.1 . . . 302.4. The plurality of servers 302.1 . . . 302.4 include a first server 302.1, a second server 302.2, a third server 302.3 and a fourth server 303.4, which are communicatively connected with the client 303. The first server 302.1 is associated with the first equipment 301.1, the second server 302.2 associated with the second equipment 301.2, the third server 302.3 associated with the third equipment and the fourth server 303.4 associated with the fourth equipment 301.4. The client 303, along with the plurality of servers 302.1 . . . 302.4, is configured to monitor the plurality of equipment 301.1 . . . 301.4. The control system and the plurality of equipment 301.1 . . . 301.4 are deployed in the SNMP based network.

For monitoring the plurality of equipment 301.1 . . . 301.4, configuration file associated with each of the plurality of equipment 301.1 . . . 301.4 is received by the client 303, as shown in FIG. 3a. The configuration file from the plurality of equipment 301.1 . . . 301.4 is transmitted from the system engineering tool 150 to the at least one client 303. In an embodiment the configuration file is in the generic file format and comprises equipment data associated with the respective equipment. The equipment data may include, but not limited to, at least one of equipment name, equipment type, equipment SNMP capability, equipment MAC address, equipment IP address and so on of the respective equipment. For example, the equipment of the first equipment 301.1 and the fourth equipment 301.4 may be as shown below:

First Equipment 301.1:
"equipment name"="first equipment"
"equipment SNMP capability="1",
"equipment MAC address"="00-14-22-01-23-45"
"equipment IP address"="216.3.128.12".

Fourth Equipment 301.4:
"equipment name"="fourth equipment"
"equipment SNMP capability"="0",
"equipment MAC address"="00-11-22-03-28-55"
"equipment IP address"="215.4.198.02".

Based on the configuration file, one or more equipment from the plurality of equipment 301.1 ... 301.4 which are capable of reporting monitoring objects in the SNMP based network are identified by the client 303. From the given example, the client 303 identifies that the fourth equipment 301.4 is not SNMP enabled and the first equipment 301.1 is SNMP enabled. Consider the second equipment 301.2 and the third equipment 301.3 are also identified to be SNMP enabled and capable of reporting monitoring objects in the SNMP based network. The client 303 is configured to establish communication channels with each of the first equipment 301.1, the second equipment 301.2 and the third equipment 301.3, as described above.

Upon establishing the communication channel the capability file is received from each of the first equipment 301.1, the second equipment 301.2 and the third equipment 301.3 through the communication channels. The capability file indicates one or more monitoring objects that the equipment is capable to communicate via the communication channels.

Based on the capability file, polling for the one or more monitoring objects from the one or more equipment is performed, for monitoring the plurality of equipment 301.1 ... 301.4. For polling, the Management Information Base (MIB) data is generated for each of the first equipment 301.1, the second equipment 301.2 and the third equipment 301.3 based on corresponding capability file. The MIB data is transmitted to the corresponding equipment for polling. In the USM mode, the USM credential is also transmitted along with the MIB data (not shown in the Figure). Each of the first equipment 301.1, the second equipment and the third equipment 301.3 responds to the client 303 with status values of the one or more monitoring objects indicated in the respective MIB.

Figure 4:
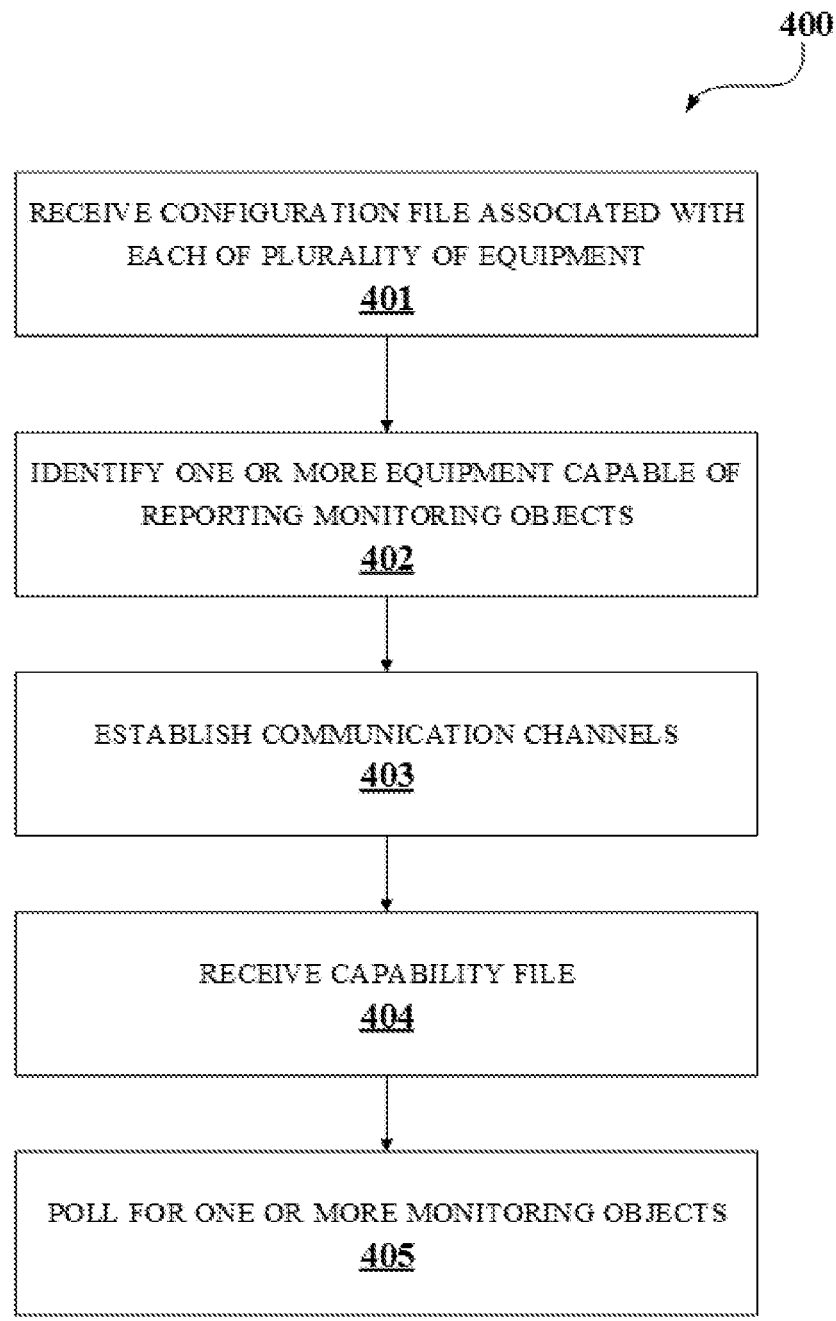
FIG. 4 illustrates a flowchart for monitoring plurality of SNMP enabled equipment in an industrial plant in a SNMP based network, in accordance with an embodiment of the present disclosure.

FIG. 4 illustrates a flowchart 400 for monitoring the plurality of equipment 101 in the SNMP based network.

At block 401, the at least one client 103 of the control system 100 may be configured to receive configuration file associated with each of the plurality of equipment 101. The configuration file may be in a generic file format and may include the equipment data associated with the plurality of equipment 101.

At block 402, the at least one client 103 of the control system 100 may be configured to identify the one or more equipment from the plurality of equipment 101 to be capable of reporting monitoring objects in the SNMP based network. The configuration file may be used for the identification.

At block 403, the at least one client 103 of the control system 100 may be configured to establish the communication channels for each of the one or more equipment. The communication channels may be established by registering the one or more equipment using the certificate authority.

At block 404, the at least one client 103 of the control system 100 may be configured to receive the capability file from each of the one or more equipment through the communication channels. The capability file of an equipment indicates one or more monitoring objects that the equipment is capable to communicate via the communication channels At block 405, the at least one client 103 of the control system 100 may be configured to poll for the one or more monitoring objects from the one or more equipment based on the capability file. Each of the one or more equipment provides corresponding one or more monitoring objects to the at least one client 103, upon the polling, for monitoring.

It is to be noted by a person skilled in the art while the above invention is described in relation SNMP based networks, the invention may be used this invention can be applied for devices with various monitoring capabilities such as syslog, but not only limited to syslog. In general, the invention is applicable to configuration of monitoring agents in a device irrespective of the monitoring protocol. Configuration of Syslog daemons can be addressed using the same secure mechanisms as described in this invention for SNMP.

Embodiments of the present invention provision no significant changes to existing industrial plant commissioning workflow despite introduction of the SNMP based network for monitoring of equipment in the industrial plant.

Embodiments of the present invention reduce commissioning or configuration effort required to initialize and configure a huge fleet of SNMP enabled equipment. The present invention proposes to automatically determine equipment which are SNMP enabled using configuration file.

Embodiments of the present invention eliminate the need to manually and individually configure each SNMP enabled equipment with USM credential.

Embodiments of the present invention eliminate the need to manually fetch information describing monitoring objects that SNMP enabled equipment are capable of reporting. By this, polling of the monitoring objects may is done with efficient utilization of network traffic.

Embodiments of the present invention provision secure configuration and operational workflow for performing cyber security situation monitoring on equipment in industrial plant.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

REFERRAL NUMERALS

| Reference Number | Description |
| --- | --- |
| 100 | Control System |
| 101 | Plurality of equipment |
| 102 | Plurality of servers |
| 103 | At least one client |
| 104 | Database |
| 105 | One or more workstations |
| 106 | Routers/Firewalls |
| 107 | Internet |
| 108 | Remote terminal |
| 150 | System engineering tool |
| 201 | Certificate authority |
| 301.1 | First equipment |
| 301.2 | Second equipment |
| 301.3 | Third equipment |
| 301.4 | Fourth equipment |
| 302.1 | First server |
| 302.2 | Second server |

-continued

REFERRAL NUMERALS

| Reference Number | Description |
|---|---|
| 302.3 | Third server |
| 302.4 | Fourth server |
| 303 | Client |

We claim:

1. A method for monitoring a plurality of equipment in an industrial plant using a network, wherein each of the plurality of equipment is associated with a control system in the network, wherein the control system comprises a plurality of servers, at least one client and a database, wherein each of the plurality of equipment is associated with at least one distinct server from the plurality of servers communicatively connected with the at least one client, wherein the method is performed by the at least one client by:
  - receiving a configuration file associated with each of the plurality of equipment, wherein the configuration file is in a generic file format and comprises equipment data associated with the plurality of equipment;
  - identifying one or more equipment from the plurality of equipment using the configuration file, the one or more equipment being capable of reporting monitoring objects in the network;
  - establishing communication channels for each of the one or more equipment, wherein establishing the communication channels comprises:
    - using a certificate authority in Transport Layer Security (TLS) mode;
    - performing a handshake with each of the one or more equipment using a digital certificate issued by the certificate authority to the at least one client and the one or more equipment; and
    - verifying authenticity of each of the one or more equipment based on the handshake;
  - receiving a capability file from each of the one or more equipment through the communication channels, wherein the capability file of an equipment indicates one or more monitoring objects that the corresponding one or more equipment is capable to communicate via the communication channels; and
  - polling for the one or more monitoring objects from the corresponding one or more equipment based on the capability file, for monitoring the plurality of equipment.

2. The method as claimed in claim 1, wherein the generic file format of the configuration file is Java Script Object Notation (JSON format), wherein the configuration file is converted to Extensible Markup Language (XML) format for identifying the one or more equipment.

3. The method as claimed in claim 1, wherein the polling based on the capability file comprises:
  - generating Management Information Base (MIB) data for each of the one or more equipment based on corresponding capability file; and
  - transmitting the MIB data to the corresponding equipment for polling.

4. The method as claimed in claim 1, wherein the network is a Simple Network Management Protocol (SNMP) based network.

5. A method for monitoring a plurality of equipment in an industrial plant using a network, wherein each of the plurality of equipment is associated with a control system in the network, wherein the control system comprises a plurality of servers, at least one client and a database, wherein each of the plurality of equipment is associated with at least one distinct server from the plurality of servers communicatively connected with the at least one client, wherein the method is performed by the at least one client by:
  - receiving a configuration file associated with each of the plurality of equipment, wherein the configuration file is in a generic file format and comprises equipment data associated with the plurality of equipment;
  - identifying one or more equipment from the plurality of equipment using the configuration file, the one or more equipment being capable of reporting monitoring objects in the network;
  - establishing communication channels for each of the one or more equipment, wherein establishing the communication channels comprises:
    - using a certificate authority in User based Security Model (USM) mode;
    - generating a USM security configuration file for each of the one or more equipment, wherein the USM security configuration file for a corresponding equipment from the one or more equipment comprises Internet Protocol (IP) address associated with the at least one client and USM credential for the corresponding equipment; and
    - transmitting the USM security configuration file to the corresponding equipment upon encrypting the USM security configuration file using the digital certificate;
  - receiving a capability file from each of the one or more equipment through the communication channels, wherein the capability file of an equipment indicates one or more monitoring objects that the corresponding one or more equipment is capable to communicate via the communication channels; and
  - polling for the one or more monitoring objects from the corresponding one or more equipment based on the capability file, for monitoring the plurality of equipment.

6. The method as claimed in claim 5, wherein the generic file format of the configuration file is Java Script Object Notation (JSON format), wherein the configuration file is converted to Extensible Markup Language (XML) format for identifying the one or more equipment.

7. The method as claimed in claim 5, wherein the polling based on the capability file comprises:
  - generating Management Information Base (MIB) data for each of the one or more equipment based on corresponding capability file; and
  - transmitting the MIB data to the corresponding equipment for polling.

8. The method as claimed in claim 5, wherein the network is a Simple Network Management Protocol (SNMP) based network.

* * * * *